US008265936B2

(12) United States Patent
Agapi et al.

(10) Patent No.: US 8,265,936 B2
(45) Date of Patent: Sep. 11, 2012

(54) METHODS AND SYSTEM FOR CREATING AND EDITING AN XML-BASED SPEECH SYNTHESIS DOCUMENT

(75) Inventors: Ciprian Agapi, Lake Worth, FL (US); Oswaldo Gago, Margate, FL (US); Maria Elena Smith, Davie, FL (US); Roberto Vila, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 12/132,412

(22) Filed: Jun. 3, 2008

(65) Prior Publication Data

US 2009/0299733 A1 Dec. 3, 2009

(51) Int. Cl.
*G10L 21/00* (2006.01)
(52) U.S. Cl. ............... 704/270.1; 704/246; 704/251; 704/252; 704/270
(58) Field of Classification Search ............... None
See application file for complete search history.

(56) References Cited

U.S. PATENT DOCUMENTS

| 6,081,780 | A  | * | 6/2000  | Lumelsky      | 704/260 |
|-----------|----|---|---------|---------------|---------|
| 6,446,040 | B1 |   | 9/2002  | Socher et al. |         |
| 6,810,378 | B2 |   | 10/2004 | Kochanski et al. |      |
| 6,823,309 | B1 | * | 11/2004 | Kato et al.   | 704/267 |
| 7,143,038 | B2 | * | 11/2006 | Katae         | 704/258 |
| 7,305,342 | B2 |   | 12/2007 | Shizuka et al.|         |
| 2002/0193994 | A1 | * | 12/2002 | Kibre et al. | 704/260 |
| 2007/0100629 | A1 | * | 5/2007  | Bodin et al. | 704/261 |
| 2007/0101313 | A1 | * | 5/2007  | Bodin et al. | 717/114 |

* cited by examiner

*Primary Examiner* — Leonard Saint Cyr
(74) *Attorney, Agent, or Firm* — Novak Druce + Quigg LLP

(57) ABSTRACT

A method for creating and editing an XML-based speech synthesis document for input to a text-to-speech engine is provided. The method includes recording voice utterances of a user reading a pre-selected text and parsing the recorded voice utterances into individual words and periods of silence. The method also includes recording a synthesized speech output generated by a text-to-speech engine, the synthesized speech output being an audible rendering of the pre-selected text, and parsing the synthesized speech output into individual words and periods of silence. The method further includes annotating the XML-based speech synthesis document based upon a comparison of the recorded voice utterances and the recorded synthesized speech output.

20 Claims, 4 Drawing Sheets

100

METHODS AND SYSTEM FOR CREATING AND EDITING AN XML-BASED SPEECH SYNTHESIS DOCUMENT

FIELD OF THE INVENTION

The present invention is related to the field of speech synthesis, and more particularly, to techniques for effectively and efficiently creating and editing a text-to-speech document using an XML-based speech synthesis application.

BACKGROUND OF THE INVENTION

XML, the Extensible Markup Language, is a general-purpose specification for creating custom markup languages. XML is said to be extensible in that it has no predetermined format, but rather is a meta-language for describing other languages. Thus, XML enables users to design customized markup languages for various types of documents and to define user-specified elements. XML is used to encode documents and to serialize data. One of the benefits provided by XML is that it facilitates the sharing of structured data across different information systems, especially via the Internet.

XML encompasses XML-based speech synthesis application, such as the Speech Synthesis Markup Language (SSML) based on the recommendation of the World Wide Web Consortium (W3C) voice browser working group. XML-based speech synthesis applications use the XML format to annotate text input to a speech synthesizer. Using defined elements to annotate the text input, an application developer can specify the structure of a document comprising the text input, provide pronunciations of words and phrases, indicate phrasing, emphasis, pitch and speaking rate, and control other critical speech characteristics. In the absence of annotation using SSML or another XML-based speech synthesis application, a speech synthesizer alone must be relied on to interpret the text input in generating a synthesized speech output.

Not withstanding the distinct advantages proved by an XML-based speech synthesis application, using such an application can be tedious. Often times a number of repetitive tasks are involved in creating or editing marked up text for input to a text-to-speech system using the tags and rules specified by a SSML or other XML-based speech synthesis application.

SUMMARY OF THE INVENTION

The invention is directed to systems and methods that can simplify the creation and editing of a document using the rules and tags specified by an XML-based speech synthesis application. With the invention, tagged text can be generated using an XML-based speech synthesis application and then efficiently and easily be provided to a text-to-speech engine for processing.

One embodiment is a system for creating and editing an XML-based speech synthesis document for input to a text-to-speech engine. The system can include one or more processors for executing processor-executable instructions. The system also can include a text-to-speech engine configured to execute on the one or more processors for audibly rendering an XML-based speech synthesis document corresponding to a pre-selected text. Additionally, the system can include at least one recording device for recording voice utterances of a user reading the pre-selected text and for recording a synthesized speech output generated by the text-to-speech engine, the synthesized speech output comprising an audible rendering of the same pre-selected text. The system can also include a parser for parsing the recorded voice utterances into individual words and periods of silence and for parsing the synthesized speech output into corresponding individual words and periods of silence. The system further can include a speech synthesis document comparator-annotator for annotating the XML-based speech synthesis document based upon a comparison of the recorded voice utterances and the recorded synthesized speech output.

Another embodiment is method for creating and editing an XML-based speech synthesis document for input to a text-to-speech engine. The method can include recording voice utterances of a user reading a pre-selected text and parsing the recorded voice utterances into individual words and periods of silence. The method also can include recording a synthesized speech output generated by a text-to-speech engine, the synthesized speech output comprising an audible rendering of the pre-selected text, and parsing the synthesized speech output into individual words and periods of silence. The method further can include annotating the XML-based speech synthesis document based upon a comparison of the recorded voice utterances and the recorded synthesized speech output.

Yet another embodiment is a computer-readable storage medium having computer-readable code embedded therein. The computer-readable code can be configured so that when loaded to and executed by a computing system causes the system to: record voice utterances of a user reading a pre-selected text; parse the recorded voice utterances into individual words and periods of silence; record a synthesized speech output generated by a text-to-speech engine, the synthesized speech output comprising an audible rendering of the pre-selected text; parse the synthesized speech output into individual words and periods of silence; and annotate a XML-based speech synthesis document based upon a comparison of the recorded voice utterances and the recorded synthesized speech output.

BRIEF DESCRIPTION OF THE DRAWINGS

There are shown in the drawings, embodiments which are presently preferred. It is expressly noted, however, that the invention is not limited to the precise arrangements and instrumentalities shown in the drawings.

DETAILED DESCRIPTION

Figure 1:
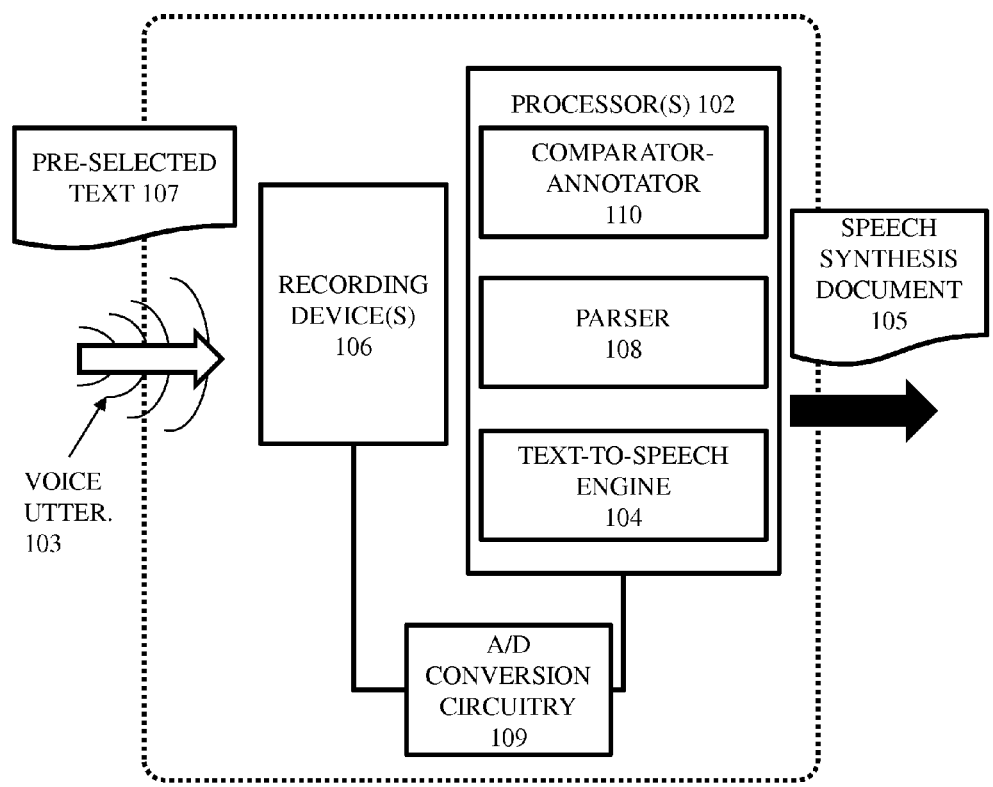
FIG. 1 is a schematic view of a system for generating and representing XML data, according to one embodiment of the invention.

Referring initially to FIG. 1, a schematic view is shown of a system 100 for generating and representing XML data, according to one embodiment of the invention. The system 100 illustratively includes one or more processors 102, which can comprise a plurality of registers, logic-gates, and other logic-based circuitry (not explicitly shown) for processing electronic data according to a predetermined set of processing instructions. The system 100 also illustratively includes a text-to-speech engine 104 configured to execute on the one or more processors for audibly rendering an XML-based speech synthesis document 105 corresponding to a pre-selected text 107.

Additionally, the system 100 illustratively includes one or more recording devices 106 for recording voice utterances 103 of a user reading the pre-selected text 107 and for recording a synthesized speech output generated by the text-to-speech engine 104, the synthesized speech output comprising an audible rendering of the pre-selected text. Optionally, the system 100 can include analog-to-digital (A/D) conversion circuitry 109 for digitizing analog signals generated in response to the voice utterances 103 that are recorded by the one or more recording devices 106 The system 100 also illustratively includes a parser 108 for parsing the recorded voice utterances into individual words and periods of silence and for parsing the synthesized speech output into corresponding individual words and periods of silence.

The system 100 further illustratively includes a speech synthesis document comparator-annotator 110. The speech synthesis document comparator-annotator 110, more particularly, is configured to annotate the XML-based speech synthesis document 105 based upon a comparison of the recorded voice utterances and the recorded synthesized speech output. The speech synthesis document comparator-annotator 110 is preferably implemented in a combination of processing circuitry and processor-executable that when executed by the processing circuitry performs the procedures and functions described herein. In alternative embodiments, however, the speech synthesis document comparator-annotator 110 can be implemented in dedicated hardwired circuitry configured to effect the same procedures and functions.

The operative features of the system 100 can be illustrated by a description of the process of creating or editing a marked up text for input to any text-to-speech system. Although described herein primarily in the context of tags and rules for creating SSML documents, it will be readily apparent that the same operative features lend themselves to creating an XML-based speech synthesis document utilizing the rules and tags, or other annotations, specified by any XML-based speech synthesis application. Once created the XML-based speech synthesis document can be input to a text-to-speech system for processing.

An exemplary text, T1, can include for example one or more sentences such as "Hello, my name is John Doe. I would definitely want to buy a HD2008 TV." The procedures and functions performed by the system 100 can be initiated when a system user begins the SSML or other XML-based speech synthesis application for auto tagging a speech synthesis document. As will be readily understood by one of ordinary skill in the art, the auto tagging can be effected for example, using a point-and-click device, by the user highlighting and clicking over a portion of the document and the selecting the command "Add SSML" (or other XML-based speech synthesis application command). Optionally, the system 100 can provide a notification, such as a terminal screen pop up or other visual indicator, instructing the user to utter the text T1.

The system 100 responds with one recording device 106 recording the user's voice utterances as the user reads the text T1. The parser 108 then parses from the recording the individual words spoken, as well as periods of silence. The system 100 can be configured such that the parsed words and silences are saved as distinct audio and silence files in an electronic memory (not explicitly shown).

Subsequently, or in parallel with the already-described procedures, the text T1 can be input to the text-to-speech engine 104. The audible rendering of the text T1 produced by the text-to-speech engine 104 can be recorded by the same recording device 106 or another. The parser 108 then parses the recorded synthesized speech output generated by the text-to-speech engine 104, parsing the synthesized speech output generated into words and periods of silence. Again, the parsed words can be saved by the system 100 as distinct audio and silence files.

The parsed version of the synthesized speech output can be used by the comparator-annotator 110 as a reference or basis for comparison. Specifically, in a particular embodiment the comparator-annotator 110 can compare characteristics of the recorded user speech to the corresponding portions of the base and determine whether the difference exceeds a predetermined threshold. Moreover, the thresholds can be adjusted dynamically as the segments are analyzed. For example, differences in amplitudes of corresponding words from the recorded voice utterances 107 and those of the recorded synthesized speech output can be compared to a predetermined threshold. If the difference exceeds the predetermined threshold, the comparator-annotator 110 can be configured to insert an appropriate element:

$$|Amplitude_{speech} - Amplitude_{base}| > Amplitude_{threshold} => \text{insert} <emphasis> \text{element.}$$

Accordingly, the system 100 provides the annotated XML-based speech synthesis document 105 with a tag indicating that emphasis such be supplied to the particular word.

The speech synthesis document comparator-annotator 110, according to another embodiment, can be configured to determine, based upon the comparison, whether a difference between a speech length of a word (i.e., the duration in which the word is enunciated in the recording) contained in the recorded voice utterances and a synthesized speech length of a corresponding word contained in the synthesized speech output exceeds a predetermined threshold. The speech synthesis document comparator-annotator 110 can be further configured to annotate the XML-based speech synthesis document with an XML prosody element to increase the synthesized speech length of the corresponding word if the difference exceeds the predetermined threshold:

$$|Length_{speech} - Length_{base}| > Length_{threshold} => \text{insert} <prosody> \text{element.}$$

In yet another embodiment, the speech synthesis document comparator-annotator 110 can be configured to determine, based upon the comparison, whether a difference between a period of silence between a pair of words contained in the recorded voice utterances and a period of silence between a pair of corresponding words contained in the synthesized speech output exceeds a predetermined threshold. The speech synthesis document comparator-annotator 110 can be configured to annotate the XML-based speech synthesis document with an XML break element to increase the period of silence between the pair of corresponding words if the difference exceeds the predetermined threshold:

$$|Pause_{speech} - Pause_{base}| > Pause_{threshold} => \text{insert} <break> \text{element.}$$

Accordingly, in the context of the exemplary text, T1, the operative features yield the following illustrative result using, for example, SSML tags:

```
<speak>
    Hello
    <break time="2s"/> my name is <emphasis level="strong">
    John Doe
    </emphasis>.
    I <prosody rate="slow"> would </prosody>
    definitely like to order a brand new
    <prosody volume="loud">HD2008 TV</prosody>
<speak>
```

According to still another embodiment, the comparator-annotator 110 can be further configured to generate a plurality of partial phrase grammars. Using the exemplary text T1, the comparator-annotator 110 can generate, for example, the following partial phrase grammars:

I would
I would definitely
I would definitely want
I would definitely want to
I would definitely want to buy
I would definitely want to buy a
I would definitely want to buy a HD
I would definitely want to buy a HD 2008
I would definitely want to buy a HID 2008 TV
. . . .
2008 TV
TV The comparator-annotator 110, according to this embodiment, is further configured to determine whether partial phrase grammars recognized and rendered in the form of synthesized speech by the text-to-speech engine 104 match corresponding portions of the text input, illustrated by the exemplary text T1. If the synthesized speech output fails to match the pre-selected text, the comparator-annotator 110 concatenates two sequential segments, R and R+1, of the synthesized speech output and then determines whether the resulting concatenation matches a corresponding fragment or portion of the text input. If not, the comparator-annotator 110 can identify a word missing from the synthesized speech output. Beginning with R=1 (i.e., the first recognized segment of the synthesized speech output), the process can iteratively repeat each of these steps until the comparator-annotator 110 determines that the synthesized speech output matches the pre-selected text.

Thus, for example, using the exemplary grammars derived from the text T1, the following can be recognized:

"Hello my name is John Doe. I would definitely want to buy", as the first recognition, and "2008 TV", as the second recognition.

The comparator-annotator 110 concatenates these two recognized segments to generate the following:

"Hello my name is John Doe. I would definitely want to buy 2008 TV," which the comparator-annotator 110 recognizes as lacking the term "HD" because the user substituted the term in place of "High Definition. Accordingly, the comparator-annotator 110 further interprets the result as the following in terms of SSML:

```
<sub alias="">HD<sub/>.
```

The alias can be left blank for the user to fill it in.

In an alternative embodiment, the system 100 can detect where an SSML <sub> is to be inserted is to convey the recorded voice utterances as an audio file to a transcription server. The server returns the text, the comparison is made between the original text input and transcribed text showing where any differences occur. At the points of difference, the comparator-annotator 110 can provide the <sub> tag.

In yet another embodiment, the comparator-annotator 110 can be configured to determine, based upon the comparison, whether synthesized speech output includes one or more recognized numerical digits. The comparison, more particularly, comprises comparing recorded voice utterances of the numerical digits and the recorded synthesized speech output rendering of the numerical digits so as to determine whether number chunking occurs. According to this embodiment, if number chunking is determined to occur, the comparator-annotator 110 is configured to annotate the XML-based speech synthesis document where the number chunking occurs.

According to this particular embodiment, the system 100 optionally includes a recognition engine (not explicitly shown) for recognizing spoken digits. The recognition engine, in the present context, is thus specifically configured to recognize the occurrence of spoken digits or numbers within the voice utterance spoken.

Figure 4A:
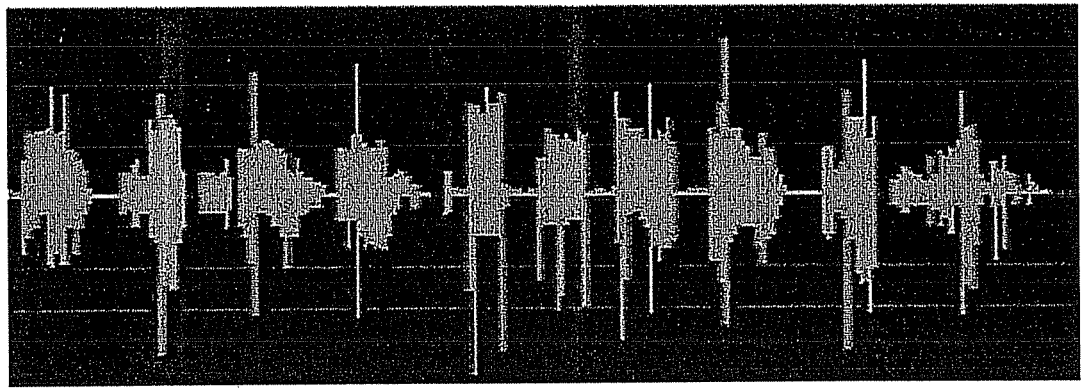
FIGS. 4a and b are exemplary waveforms of, respectively, voice utterances of a user reading a pre-selected text containing a sequence of digits and an audible rendering of the same text by a text-to-speech engine.
Figure 4B:
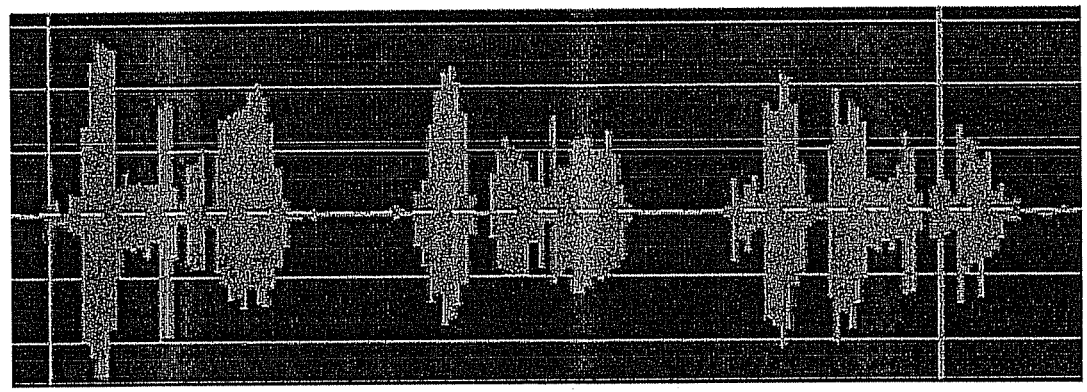

Absent appropriate annotation, the text-to-speech engine 104 audibly renders digits as they would be if spoken in a smooth or continuous manner. Thus, the audible rendering of the digits 5611234567, for example, by the text-to-speech engine 104 would have a waveform as shown in FIG. 4*a*. By contrast, if the same digits are spoken with number chunking, as for example when the digits are those of a phone number with area code, the corresponding waveform appears as shown in FIG. 4*b*.

In this particular embodiment, the comparator-annotator compares the voice recording of a user reading text input containing a sequence of digits with an audible rendering of the same text generated by the text-to-speech engine. When the user reads the digits with appropriately-spaced pause intervals (e.g., as with reading telephone numbers, credit card numbers, or other sequence of digits that are read non-continuously with number chunking), but the text-to-speech engine renders the same sequence of digits in a continuous manner, the comparator-annotator 110 in comparing the different recordings determines the discrepancy. The comparator-annotator 110, noting the difference between the read text with digits and the text-to-speech rendering of the same text, responds by applying appropriate tags to the corresponding speech synthesis document.

Thus, the comparator-annotator 110 is configured to provide an annotation, such as the following SSML <say-as> tag, if based on the comparison, the numbers are to be rendered without pauses:

```
<say-as interpret-as="digits">5611234567</say-as>
```

Conversely, if the representative digit sequence is to be rendered with number chunking, the comparator-annotator 110 can appropriately place within the speech synthesis document tags indicating where number chunking occurs. Thus, for example, if the same sequence of digits correspond to those of a telephone number plus area code and are to be rendered as such with two appropriately-positioned pauses, then the following SSML <say-as> tag is provided by the comparator-annotator 110 so as to mark the respective chunks of 3, 3, and 4 digits:

```
<say-as interpret-
    as="number"format="telephone">561-123-
    4567</say-as>.
```

Figure 2:
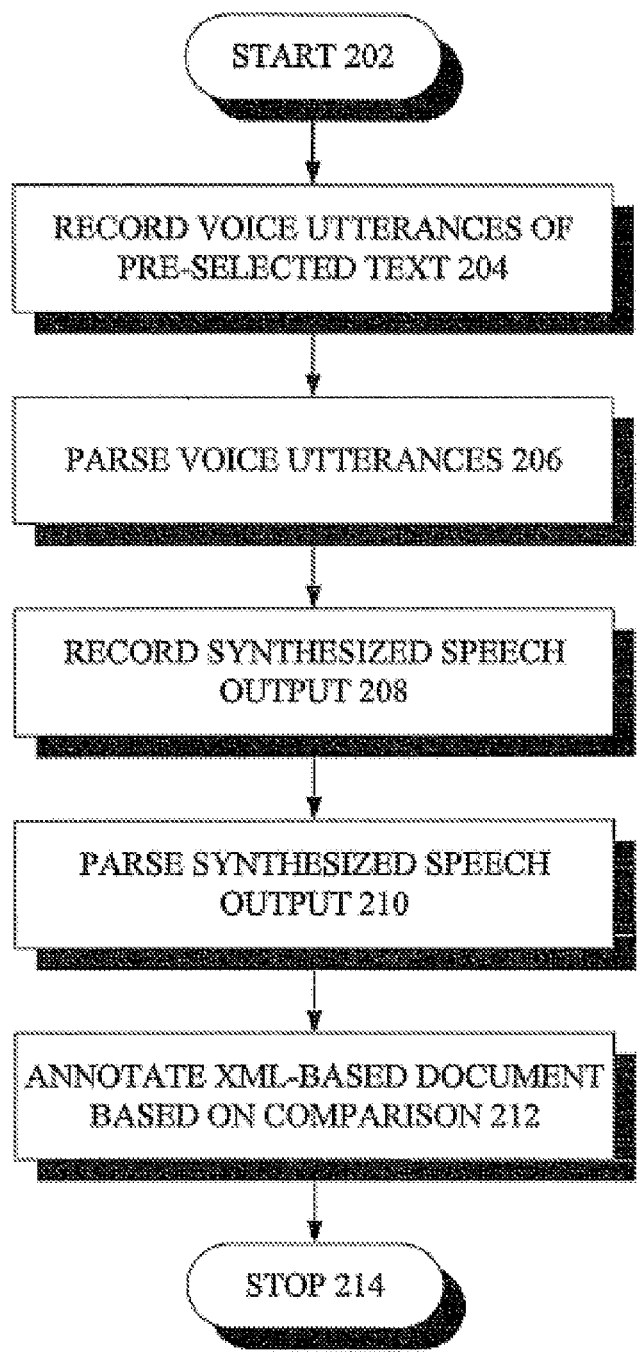
FIG. 2 is a flowchart of exemplary steps in a method for creating and editing an XML-based speech synthesis document for input to a text-to-speech engine, according to another embodiment of the invention.

FIG. 2 is a flowchart illustrative of certain method aspects of the invention. The flowchart illustrates exemplary steps in a method 200 for creating and editing an XML-based speech synthesis document for input to a text-to-speech engine. The method illustratively includes, after the start at step 202, recording voice utterances of a user reading a pre-selected text at step 204. At step 206, the method 200 illustratively includes parsing the recorded voice utterances into individual words and periods of silence. The method 200 also illustratively includes recording a synthesized speech output generated by a text-to-speech engine at step 208, the synthesized speech output comprising an audible rendering of the same pre-selected text. At step 210, the method 200 further illustratively includes parsing the synthesized speech output into individual words and periods of silence. The method 200 illustratively includes, at step 212, annotating the XML-based speech synthesis document based upon a comparison of the recorded voice utterances and the recorded synthesized speech output. Illustratively, the method 200 concludes at step 214.

According to one embodiment, the comparison performed at step 212 comprises determining whether a difference between an amplitude of a word contained in the recorded voice utterances and an amplitude of a corresponding word contained in the synthesized speech output exceeds a predetermined threshold. The annotating step 212, according to this embodiment, further comprises annotating the XML-based speech synthesis document with an XML emphasis element to add emphasis to the corresponding word if the difference exceeds the predetermined threshold.

The comparison performed at step 212, according to another embodiment, comprises determining whether a difference between a speech length of a word contained in the recorded voice utterances and a synthesized speech length of a corresponding word contained in the synthesized speech output exceeds a predetermined threshold. According to this embodiment, the annotating step 212 further comprises annotating the XML-based speech synthesis document with an XML prosody element to increase the synthesized speech length of the corresponding word if the difference exceeds the predetermined threshold.

In yet another embodiment, the comparison performed at step 212 comprises determining whether a difference between a period of silence between a pair of words contained in the recorded voice utterances and a period of silence between a pair of corresponding words contained in the synthesized speech output exceeds a predetermined threshold. The annotating step 212 then further comprises annotating the XML-based speech synthesis document with an XML break element to increase the period of silence between the pair of corresponding words if the difference exceeds the predetermined threshold.

According to still another embodiment, the method 200 further comprises determining whether synthesized speech output includes one or more recognized numerical digits. The comparison performed at step 212 thus can further include comparing recorded voice utterances of the numerical digits and the recorded synthesized speech output rendering of the numerical digits to determine whether number chunking occurs. If number chunking is determined to occur, the annotating step 212 comprises annotating the XML-based speech synthesis document where the number chunking occurs.

Figure 3:
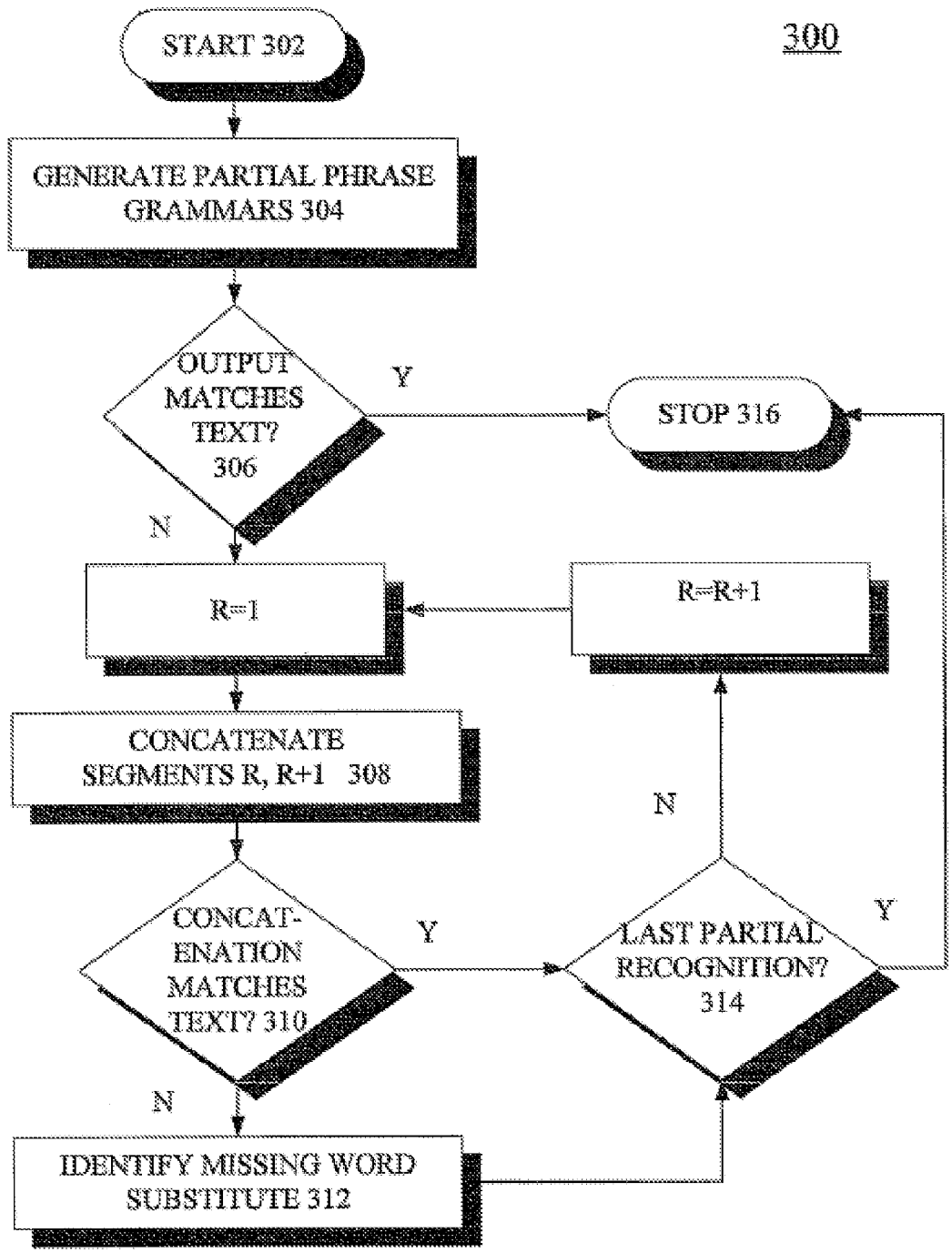
FIG. 3 is a flowchart of exemplary steps in a method for creating and editing an XML-based speech synthesis document for input to a text-to-speech engine, according to yet another embodiment of the invention.

Referring to FIG. 3, an alternative embodiment is a method 300 that includes the exemplary steps shown in the flowchart. After start at step 302, the method 300 includes generating a plurality of partial phrase grammars at step 304. A determination is made at decision block 306 whether the synthesized speech output fails to match the pre-selected text. If so, the method 300 proceeds at step 308 by concatenating the R-th and (R+1)-th (R can initially be set to 1) sequential segments of the synthesized speech output. Otherwise, the method proceeds directly to step 316 and concludes.

The method 300 can further include determining whether one or more words is missing from the synthesized speech output, and if so, identifying the one or more missing words. In this embodiment, if a determination is made at decision block 310 that the concatenation fails to match the pre-selected text, a missing word is identified at step 312; otherwise when the concatenated sequential segments do match a corresponding portion of the pre-selected text, the method proceeds to step 314. The method 300 also can include returning to step 308 (after incrementing R by one) to concatenate additional sequential segments of the synthesized speech output and repeating the subsequent steps (308-314) until the synthesized speech output matches the pre-selected text. When the synthesized speech output matches the pre-selected text, the method concludes at step 316

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, such as a magnetic or optically-readable disk in which computer-readable code defining a computer program is embedded, which when loaded in a computer system is able to carry out the functions, procedures, and methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A method for creating and editing an XML-based speech synthesis document for input to a text-to-speech engine, the method comprising:

recording voice utterances of a user reading a pre-selected text;

parsing the recorded voice utterances into individual words and periods of silence;

generating an XML-based speech synthesis document corresponding to the pre-selected text;

recording a synthesized speech output generated by a text-to-speech engine based on the XML-based speech synthesis document, the synthesized speech output comprising an audible rendering of the pre-selected text;

parsing the synthesized speech output into individual words and periods of silence; and annotating the XML-based speech synthesis document based upon a comparison of the recorded voice utterances and the recorded synthesized speech output, the annotating comprising inserting at least one of an XML emphasis element, an XML prosody element, or an XML break element into the XML-based speech synthesis document.

2. The method of claim 1, wherein the comparison comprises determining whether a difference between an amplitude of a word contained in the recorded voice utterances and an amplitude of a corresponding word contained in the synthesized speech output exceeds a predetermined threshold; and wherein the annotating step comprises annotating the XML-based speech synthesis document with the XML emphasis element to add emphasis to the corresponding word if the difference exceeds the predetermined threshold.

3. The method of claim 1, wherein the comparison comprises determining whether a difference between a speech length of a word contained in the recorded voice utterances and a synthesized speech length of a corresponding word contained in the synthesized speech output exceeds a predetermined threshold; and wherein the annotating step comprises annotating the XML-based speech synthesis document with the XML prosody element to increase the synthesized speech length of the corresponding word if the difference exceeds the predetermined threshold.

4. The method of claim 1, wherein the comparison comprises determining whether a difference between a period of silence between a pair of words contained in the recorded voice utterances and a period of silence between a pair of corresponding words contained in the synthesized speech output exceeds a predetermined threshold; and wherein the annotating step comprises annotating the XML-based speech synthesis document with the XML break element to increase the period of silence between the pair of corresponding words if the difference exceeds the predetermined threshold.

5. The method of claim 1, further comprising generating a plurality of partial phrase grammars and concatenating sequential segments of the synthesized speech output if the synthesized speech output fails to match the pre-selected text.

6. The method of claim 5, further comprising identifying a word missing from the synthesized speech output if the concatenated sequential segments fail to match a corresponding portion of the pre-selected text.

7. The method of claim 6, further comprising repeating the step of concatenating additional sequential segments of the synthesized speech output until the synthesized speech output matches the pre-selected text.

8. The method of claim 1, further comprising determining whether synthesized speech output includes one or more recognized numerical digits;

wherein the comparison comprises comparing recorded voice utterances of the numerical digits and the recorded synthesized speech output rendering of the numerical digits to determine whether number chunking occurs; and wherein if number chunking is determined to occur, the annotating step comprises annotating the XML-based speech synthesis document where the number chunking occurs.

9. A system for creating and editing an XML-based speech synthesis document for input to a text-to-speech engine, the system comprising:

one or more processors for executing processor-executable instructions;

a text-to-speech engine configured to execute on the one or more processors for generating an XML-based speech synthesis document corresponding to pre-selected text and audibly rendering the XML-based speech synthesis document corresponding to the pre-selected text;

at least one recording device for recording voice utterances of a user reading the pre-selected text and for recording a synthesized speech output generated by the text-to-speech engine based on the XML-based speech synthesis document, the synthesized speech output comprising an audible rendering of the pre-selected text;

a parser for parsing the recorded voice utterances into individual words and periods of silence and for parsing the synthesized speech output into corresponding individual words and periods of silence; and a speech synthesis document comparator-annotator for annotating the XML-based speech synthesis document based upon a comparison of the recorded voice utterances and the recorded synthesized speech output, the annotating comprising inserting at least one of an XML emphasis element, an XML prosody element, or an XML break element into the XML-based speech synthesis document.

10. The system of claim 9, wherein the speech synthesis document comparator-annotator is configured to determine, based upon the comparison, whether a difference between an amplitude of a word contained in the recorded voice utterances and an amplitude of a corresponding word contained in the synthesized speech output exceeds a predetermined threshold; and to annotate the XML-based speech synthesis document with the XML emphasis element to add emphasis to the corresponding word if the difference exceeds the predetermined threshold.

11. The system of claim 9, wherein the speech synthesis document comparator-annotator is configured to determine, based upon the comparison, whether a difference between a speech length of a word contained in the recorded voice utterances and a synthesized speech length of a corresponding word contained in the synthesized speech output exceeds a predetermined threshold; and to annotate the XML-based speech synthesis document with the XML prosody element to increase the synthesized speech length of the corresponding word if the difference exceeds the predetermined threshold.

12. The system of claim 9, wherein the speech synthesis document comparator-annotator is configured to determine, based upon the comparison, whether a difference between a period of silence between a pair of words contained in the recorded voice utterances and a period of silence between a pair of corresponding words contained in the synthesized speech output exceeds a predetermined threshold; and to annotate the XML-based speech synthesis document with the XML break element to increase the period of silence between the pair of corresponding words if the difference exceeds the predetermined threshold.

13. The system of claim 9, wherein the comparator-annotator is further configured to generate a plurality of partial phrase grammars and concatenating sequential segments of the synthesized speech output if the synthesized speech output fails to match the pre-selected text;

identify a word missing from the synthesized speech output if the concatenated sequential segments fail to match a corresponding portion of the pre-selected text; and repeat the step of concatenating additional sequential segments of the synthesized speech output until the synthesized speech output matches the pre-selected text.

14. The system of claim 9, wherein the comparator-annotator is further configured to
    determine, based upon the comparison, whether synthesized speech output includes one or more recognized numerical digits, the comparison comprising comparing recorded voice utterances of the numerical digits and the recorded synthesized speech output rendering of the numerical digits to determine whether number chunking occurs; and
    if number chunking is determined to occur, annotate the XML-based speech synthesis document where the number chunking occurs.

15. A non-transitory computer-readable storage medium having computer-readable code embedded therein, which when loaded to and executed by a computing system causes the system to:
    record voice utterances of a user reading a pre-selected text;
    parse the recorded voice utterances into individual words and periods of silence;
    generate an XML-based speech synthesis document corresponding to the pre-selected text;
    record a synthesized speech output generated by a text-to-speech engine based on the XML-based speech synthesis document, the synthesized speech output comprising an audible rendering of the pre-selected text;
    parse the synthesized speech output into individual words and periods of silence; and
    annotate a XML-based speech synthesis document based upon a comparison of the recorded voice utterances and the recorded synthesized speech output, the annotating comprising inserting at least one of an XML emphasis element, an XML prosody element, or an XML break element into the XML-based speech synthesis document.

16. The non-transitory computer-readable storage medium of claim 15, wherein the comparison comprises determining whether a difference between an amplitude of a word contained in the recorded voice utterances and an amplitude of a corresponding word contained in the synthesized speech output exceeds a predetermined threshold; and
    wherein the annotating step comprises annotating the XML-based speech synthesis document with the XML emphasis element to add emphasis to the corresponding word if the difference exceeds the predetermined threshold.

17. The non-transitory computer-readable storage medium of claim 15, wherein the comparison comprises determining whether a difference between a speech length of a word contained in the recorded voice utterances and a synthesized speech length of a corresponding word contained in the synthesized speech output exceeds a predetermined threshold; and
    wherein the annotating step comprises annotating the XML-based speech synthesis document with the XML prosody element to increase the synthesized speech length of the corresponding word if the difference exceeds the predetermined threshold.

18. The non-transitory computer-readable storage medium of claim 15, wherein the comparison comprises determining whether a difference between a period of silence between a pair of words contained in the recorded voice utterances and a period of silence between a pair of corresponding words contained in the synthesized speech output exceeds a predetermined threshold; and
    wherein the annotating step comprises annotating the XML-based speech synthesis document with the XML break element to increase the period of silence between the pair of corresponding words if the difference exceeds the predetermined threshold.

19. The non-transitory computer-readable storage medium of claim 15, further comprising embedded computer-readable code for causing the system to:
    generate a plurality of partial phrase grammars and concatenate sequential segments of the synthesized speech output if the synthesized speech output fails to match the pre-selected text;
    identify a word missing from the synthesized speech output if the concatenated sequential segments fail to match a corresponding portion of the pre-selected text; and
    repeat the step of concatenating additional sequential segments of the synthesized speech output until the synthesized speech output matches the pre-selected text.

20. The non-transitory computer-readable storage medium of claim 15, further comprising computer-readable code for causing the system to:
    determine whether the synthesized speech output includes one or more recognized numerical digits;
    compare recorded voice utterances of the numerical digits and the recorded synthesized speech output rendering of the numerical digits to determine whether number chunking occurs; and
    if number chunking is determined to occur, annotate the XML-based speech synthesis document where the number chunking occurs.

\* \* \* \* \*